US012309858B2

(12) United States Patent
Mehrotra

(10) Patent No.: US 12,309,858 B2
(45) Date of Patent: May 20, 2025

(54) GTPC (S11 AND S5 INTERFACE) OPTIMIZATION FOR EPC CORE NODES

(71) Applicant: Parallel Wireless, Inc., Nashua, NH (US)

(72) Inventor: Shivani Mehrotra, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 426 days.

(21) Appl. No.: 17/665,681

(22) Filed: Feb. 7, 2022

(65) Prior Publication Data

US 2022/0256623 A1    Aug. 11, 2022

Related U.S. Application Data

(60) Provisional application No. 63/146,445, filed on Feb. 5, 2021.

(51) Int. Cl.
*H04W 76/12*    (2018.01)
*H04W 36/14*    (2009.01)
*H04W 76/32*    (2018.01)

(52) U.S. Cl.
CPC ........... *H04W 76/12* (2018.02); *H04W 76/32* (2018.02); *H04W 36/142* (2023.05)

(58) Field of Classification Search
CPC ...... H04W 76/12; H04W 76/32; H04W 36/14
USPC ........................................................ 370/329
See application file for complete search history.

(56) References Cited

U.S. PATENT DOCUMENTS

| 7,688,859 | B2* | 3/2010 | Chen ...................... H04L 47/10 370/473 |
| 8,363,664 | B2 | 1/2013 | Ramankutty et al. |
| 8,578,035 | B2* | 11/2013 | Miklos .................. H04M 15/74 709/228 |
| 8,693,367 | B2* | 4/2014 | Chowdhury .......... H04M 15/41 370/253 |
| 8,867,361 | B2* | 10/2014 | Kempf ................ H04L 43/0882 709/224 |

(Continued)

FOREIGN PATENT DOCUMENTS

| CN | 111247832 B | * | 11/2021 | ............ H04W 36/00 |
| EP | 2477441 B1 | * | 5/2014 | ............. H04L 29/06 |

(Continued)

OTHER PUBLICATIONS

LTE; General Packet Radio Service (GPRS) enhancements for Evolved Universal Terrestrial Radio Access Network (E-UTRAN) access, (3GPP TS 23.401 version 12.6.0 Release 12), Sep. 2014.

(Continued)

*Primary Examiner* — Melvin H Pollack
(74) *Attorney, Agent, or Firm* — Michael Y. Saji

(57) ABSTRACT

Systems and methods are disclosed for providing GPRS Tunneling Protocol Core (GTPC) optimization. In one embodiment a method includes sending a first message from a Mobility Management Entity (MME) to a peer node, the first message including a feature name and socket information in a private extension over an interface; wherein a message format includes a message type, a Tunnel Endpoint Identifier (TEID) and a bitmask; when the peer node supports GTPC optimization, then confirming, by the peer node, by encoding the docket information in a response message and sending the response message to the MME.

20 Claims, 10 Drawing Sheets

(56) References Cited

U.S. PATENT DOCUMENTS

| | | | | |
|---|---|---|---|---|
| 9,204,475 | B2* | 12/2015 | Wang | H04W 76/22 |
| 9,220,110 | B2* | 12/2015 | Rune | H04L 61/4511 |
| 9,232,544 | B2* | 1/2016 | Sundell | H04W 76/10 |
| 9,420,000 | B2* | 8/2016 | Stojanovski | H04L 63/029 |
| 9,736,683 | B2* | 8/2017 | Xu | H04L 69/167 |
| 9,742,690 | B2* | 8/2017 | Parikh | H04L 43/20 |
| 9,838,924 | B2* | 12/2017 | Zhu | H04W 36/0066 |
| 9,843,923 | B2* | 12/2017 | Gopalakrishnan | H04L 43/0876 |
| 9,877,346 | B2* | 1/2018 | Sedlacek | H04W 48/16 |
| 9,949,189 | B2* | 4/2018 | Reddiboyana | H04W 36/14 |
| 10,057,126 | B2* | 8/2018 | Vedam | H04L 43/10 |
| 10,129,088 | B2* | 11/2018 | Sharma | H04L 63/101 |
| 10,200,951 | B2* | 2/2019 | Yu | H04W 52/0229 |
| 10,356,830 | B2* | 7/2019 | Jain | H04W 36/0027 |
| 10,476,851 | B1* | 11/2019 | Adams | G06F 21/602 |
| 10,530,688 | B2* | 1/2020 | Sharma | H04L 43/00 |
| 10,568,005 | B2* | 2/2020 | Das | H04W 76/27 |
| 10,637,724 | B2* | 4/2020 | Johnson | H04L 41/0803 |
| 10,652,735 | B2* | 5/2020 | Li | G08B 5/222 |
| 10,708,171 | B2* | 7/2020 | Klotsche | H04L 45/54 |
| 10,721,664 | B2* | 7/2020 | Nilsson | H04W 36/1446 |
| 10,880,266 | B1* | 12/2020 | Shribman | H04L 67/63 |
| 10,880,788 | B2* | 12/2020 | Tomici | H04W 36/18 |
| 10,897,447 | B2* | 1/2021 | Lewin-Eytan | G06Q 10/107 |
| 10,951,478 | B2* | 3/2021 | Ghadge | H04L 41/0895 |
| 10,990,371 | B2* | 4/2021 | Gutman | G06F 9/44526 |
| 11,206,593 | B2* | 12/2021 | Suthar | H04W 36/12 |
| 11,252,241 | B2* | 2/2022 | Krishna Dhulipala | H04L 67/60 |
| 11,257,198 | B1* | 2/2022 | Holub | G06V 10/82 |
| 11,265,383 | B2* | 3/2022 | Reznik | H04W 12/08 |
| 11,337,051 | B2* | 5/2022 | Neil | H04W 60/04 |
| 11,350,295 | B2* | 5/2022 | Yaniv | G06F 16/245 |
| 2011/0182244 | A1* | 7/2011 | Liang | H04W 8/082 370/328 |
| 2011/0199969 | A1* | 8/2011 | Yang | H04W 76/12 370/328 |
| 2012/0063437 | A1* | 3/2012 | Liang | H04W 76/11 370/338 |
| 2018/0270076 | A1* | 9/2018 | Natarajan | H04L 12/66 |
| 2020/0259896 | A1* | 8/2020 | Sachs | H04W 12/04 |
| 2021/0073285 | A1* | 3/2021 | Hunter | H04L 9/3263 |

FOREIGN PATENT DOCUMENTS

| | | | | |
|---|---|---|---|---|
| EP | 2286632 B1 * | 3/2017 | | H04W 24/04 |
| GB | 2581289 A * | 8/2020 | | H04W 76/10 |
| KR | 102508078 B1 * | 3/2023 | | |
| WO | WO-2011101060 A1 * | 8/2011 | | H04W 76/02 |
| WO | WO-2014085622 A1 * | 6/2014 | | H04W 76/00 |
| WO | WO-2015160932 A1 * | 10/2015 | | H04W 16/18 |

OTHER PUBLICATIONS

Universal Mobile Telecommunications System (UMTS); LTE; 3GPP Evolved Packet System (EPS); Evolved General Packet Radio Service (GPRS) Tunnelling Protocol for Control plane (GTPv2-C); Stage 3, (3GPP TS 29.274 version 15.4.0 Release 15), Jul. 2018.

* cited by examiner

GTPC (S11 AND S5 INTERFACE) OPTIMIZATION FOR EPC CORE NODES

CROSS-REFERENCE TO RELATED APPLICATIONS

This application claims priority under 35 U.S.C. § 119(e) to U.S. Provisional Pat. App. No. 63/146,445, filed Feb. 5, 2021, titled "GTPC (S11 and S5 interface) Optimization for EPC Core Nodes" which is hereby incorporated by reference in its entirety for all purposes. This application also hereby incorporates by reference, for all purposes, each of the following U.S. patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

A Mobility Management Entity (MME) is a key control node, which deals with the Evolved Packet Core (EPC) control plane and is responsible for interaction with multiple peer nodes like Home Subscriber service (HSS), eNodeB, Serving GPRS Support Node (SGSN) and Serving Gateway (SGW) etc. Its role is to manage sessions, authentication, paging, mobility, bearers and roaming. It manages an eNB and an S-GW through the S1-MME and S11 interfaces respectively and communicates with HSS through the S6 interface. An SGW is directly controlled by an MME and is responsible for routing user plane packets between an eNB (S1-U) and a PGW (S5/S8 interface). It handles user handovers between neighboring eNBs.

The main function of the Serving Gateway is routing and forwarding of user data packets. It is also responsible for inter-eNB handovers in the U-plane and provides mobility between Long term Evolution (LTE) and other types of networks, such as between 2G/3G and P-GW. The DL data from the UEs in idle state is terminated at the SGW, and arrival of DL data triggers paging for the UE.

The Packet data Network (PDN) Gateway is the connecting node between UEs and external networks. It is the entry point of data traffic for UEs. To access multiple PDNs, UEs can connect to several PGWs at the same time. The functions of the PGW include policy enforcement, packet filtering, charging support, lawful interception and packet screening S11 is the reference point providing control plane between MME and Serving GW.

The S11 Interface application node initiates the following events from an MME node:
  Create/Delete Session
  Create/Delete Default bearer
  Create/Delete Dedicated Bearer
  Add a rule to create or modify/update a dedicated bearer
  Perform UE Handover
  Perform X2 based UE Handover with SGW relocation
  Perform Si based UE Handover with SGW relocation S5 interface provides user plane tunneling and tunnel management between Serving GW and PDN GW. It is used for Serving GW relocation due to UE mobility and if the Serving GW needs to connect to a non-collocated PDN GW for the required PDN connectivity.

S8 interface is the inter PLMN variant of S5. It is an Inter-PLMN reference point providing user and control plane between the Serving GW in the VPLMN and the PDN GW in the HPLMN.

In RRC Inactive state, if UE has to be paged, Core network sends the same to gNB and gNB sends Paging to UE by using I-RNTI as UE ID in the message.

For RNA Update or response for paging, UE need to come to Connected state first and then can trigger the respective message. For coming to connected state, UE triggers Resumption procedure. For this, first UE sends PRACH preamble to gNB. gNB responds back with RAR and assigns UL resources. UE sends Resume Request to gNB. gNB responds back with RRC Resume and UE responds back with RRC Resume Complete.

SUMMARY

A method is disclosed for GTPC (S11 and S5 interface) Optimization for EPC Core Nodes. In one embodiment a method Systems and methods are disclosed for providing GPRS Tunneling Protocol Core (GTPC) optimization. In one embodiment a method includes sending a first message from a Mobility Management Entity (MME) to a peer node, the first message including a feature name and socket information in a private extension over an interface; wherein a message format includes a message type, a Tunnel Endpoint Identifier (TEID) and a bitmask; when the peer node supports GTPC optimization, then confirming, by the peer node, by encoding the docket information in a response message and sending the response message to the MME.

In another example embodiment a system providing GPRS Tunneling Protocol Core (GTPC) optimization includes a peer node in communication with a Mobility Management Entity (MME), the peer node receiving a first message from the MME, the first message including a feature name and socket information in a private extension over an interface; wherein a message format includes a message type, a Tunnel Endpoint Identifier (TEID) and a bitmask; when the peer node supports GTPC optimization, then confirming, by the peer node, by encoding the docket information in a response message and sending the response message to the MME.

DETAILED DESCRIPTION

Figure 1:
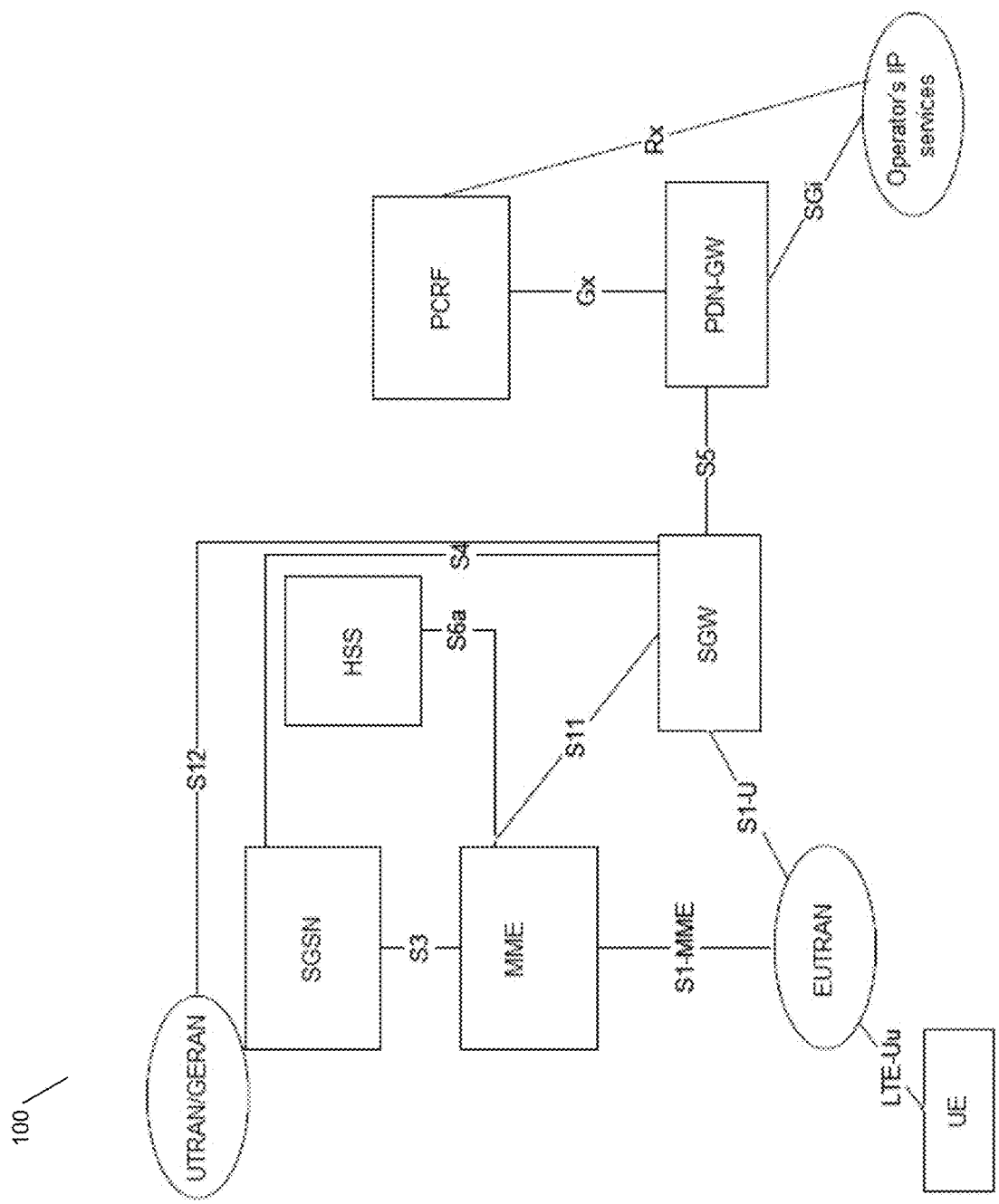
FIG. 1 is a diagram of an Evolved Packet Core architecture, in accordance with some embodiments.

While the present method and system for GTPC optimization is described relative to a 4G network, it should be appreciated that the same concepts apply to 5G networks as well. FIG. 1 shows an Evolved Packet Core (EPC) architecture 100 as defined by 3GPP 23.401. Currently, significant control messaging takes place between MME, SGW and PGW nodes over GTPC interfaces like S11, S5/S8 to support various operations like session creation/modification/deletion, bearer create/modify/delete, Downlink Data Notification Procedure and Handovers etc.

Figure 2:
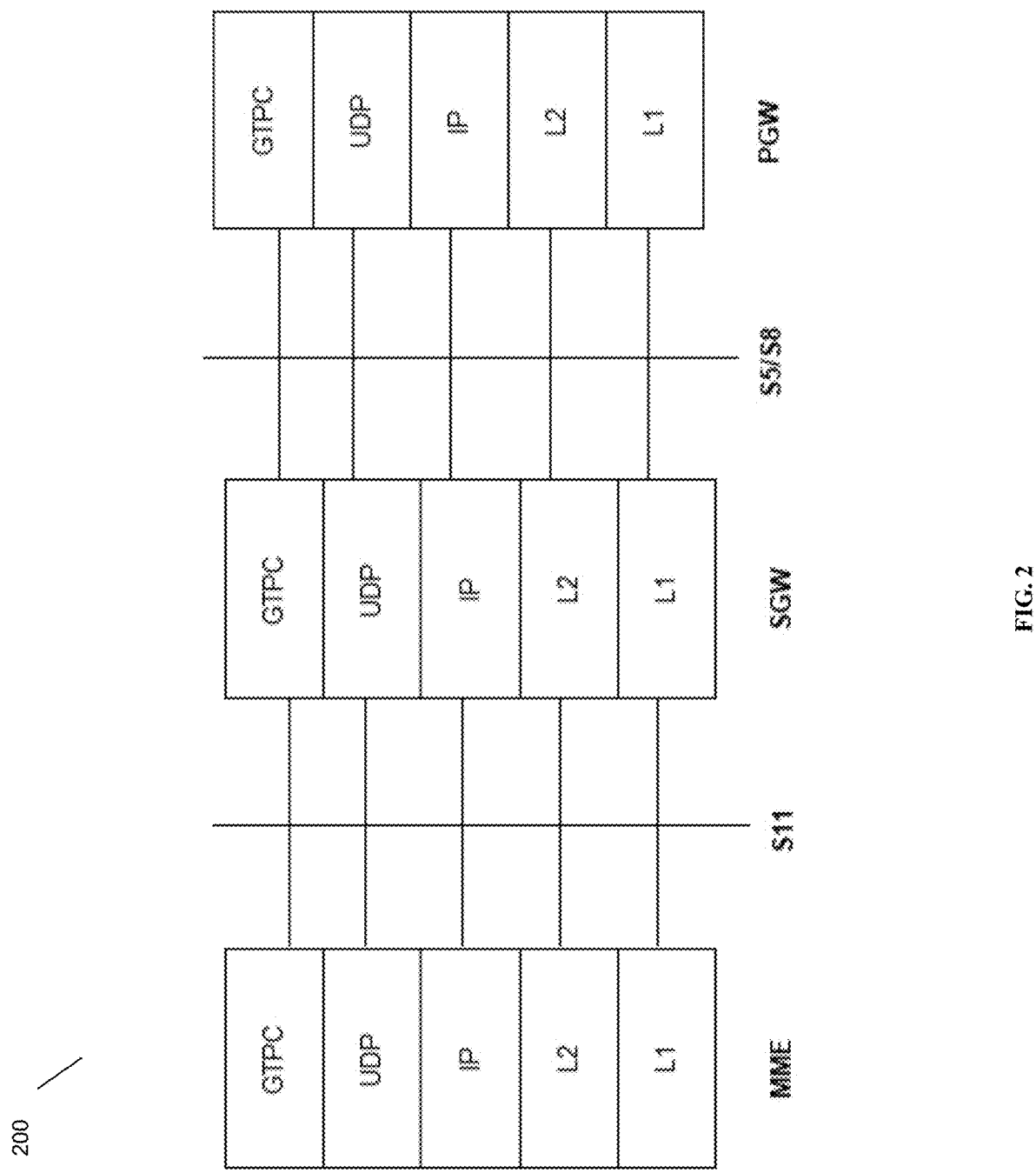
FIG. 2 is a diagram of a control plane, in accordance with some embodiments.

FIG. 2 shows a control plane 200 as used in E-UTRAN mode between these nodes.

Figure 3:
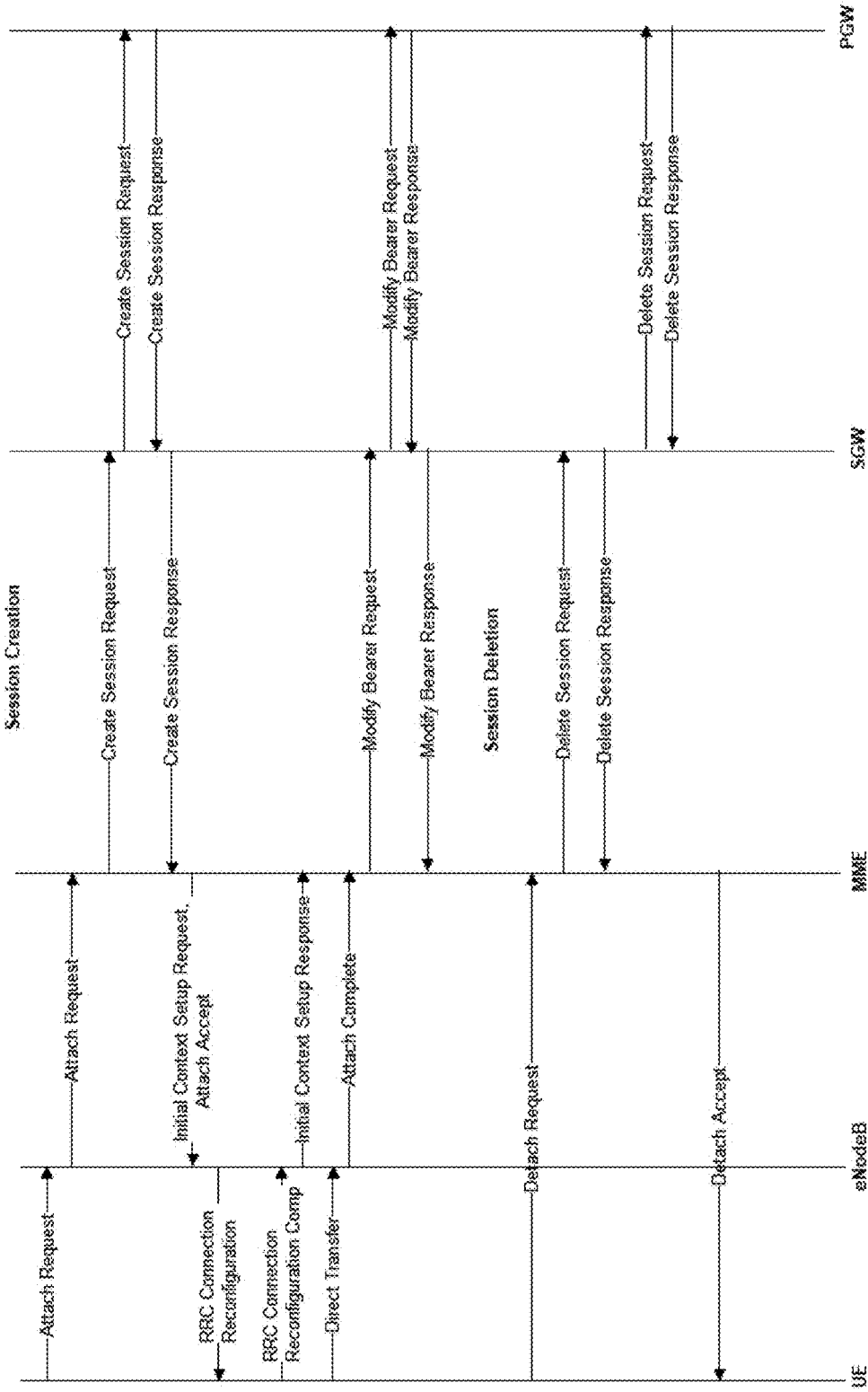
FIG. 3 is a diagram of a call flow for a session creation/deletion, in accordance with some embodiments.

FIG. 3 shows an example for call flow 300 for Session Creation/Deletion as per 3GPP 23.401. For the products supporting all these core nodes, like Het-Net-Gateway (HNG) of Parallel Wireless, this messaging can be optimized.

Currently, the only way to optimize this control path messaging today is the co-located gateway. However, this imposes the restriction of running the core nodes in the same box, which means that optimization will not work with multiple peer nodes, e.g. if UE moves to a different SGW than the one which is co-located.

The presently disclosed optimization for EPC core nodes defines an approach to optimize the control plane signaling over GTPC interfaces using the Private Extension capability provided by GTPC stack to inform peer about using the vendor specific IPC to exchange the information further.

As per approach suggested here, feature name (PW GTPC Optimization) and the socket information for the proprietary interface shall be encoded in the Private Extension IE in first message being sent (e.g. Create-Session-Request) over S11 or S5 interface.

If peer node (SGW or PGW) is HNG and supports GTPC optimization feature, it shall confirm so by encoding its socket information in the response message.

Figure 4:
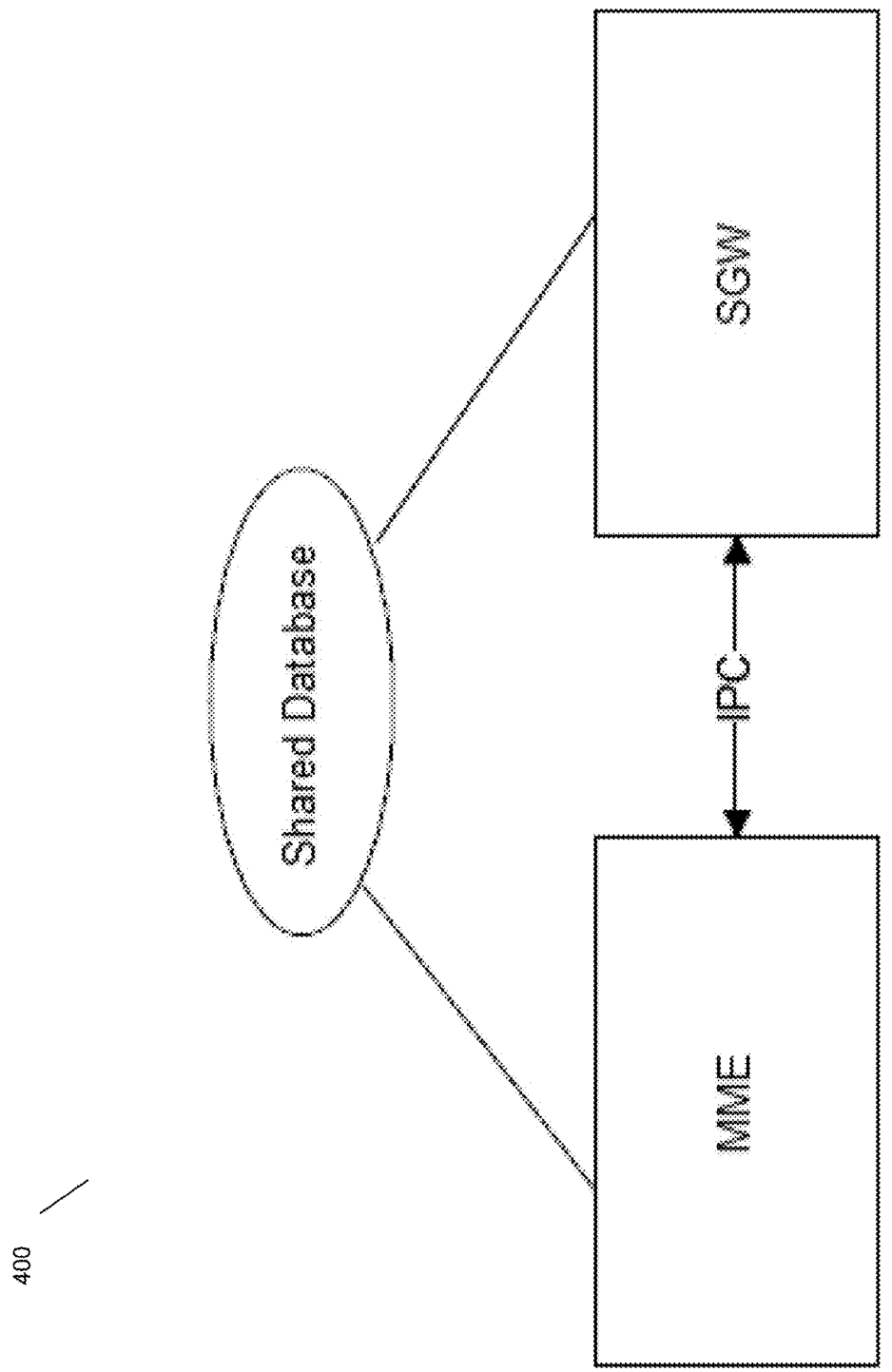
FIG. 4 is a diagram showing internode communication, in accordance with some embodiments.
Figure 5:
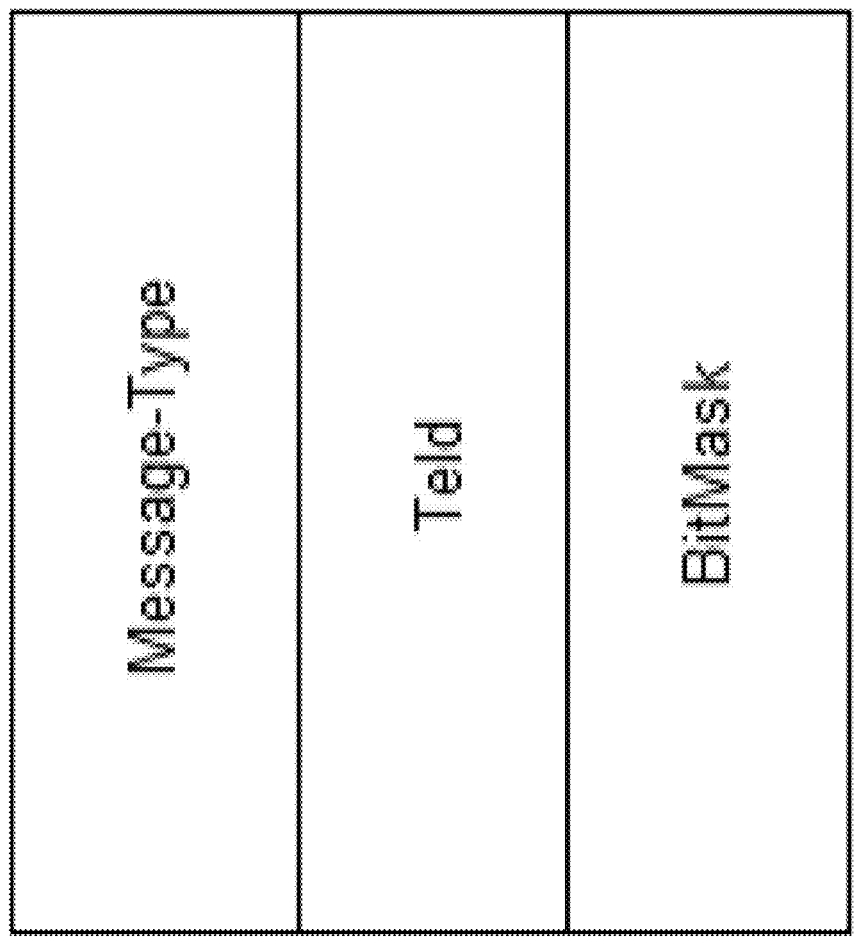
FIG. 5 is a diagram of an IPC message format, in accordance with some embodiments.

For all the subsequent messaging required between these nodes, sender node shall write the message in a shared database and inform peer to read message from Database by sending an indication via IPC. An example 400 is shown in FIG. 4 where an MME and an SGW will communicate via IPC instead of S11 interface after the first message:

The format of IPC message 500 is shown in FIG. 5

Since the size of this IPC message is very small, minimal messaging would be required over S11 and S5/S8 interfaces.

Figure 6:
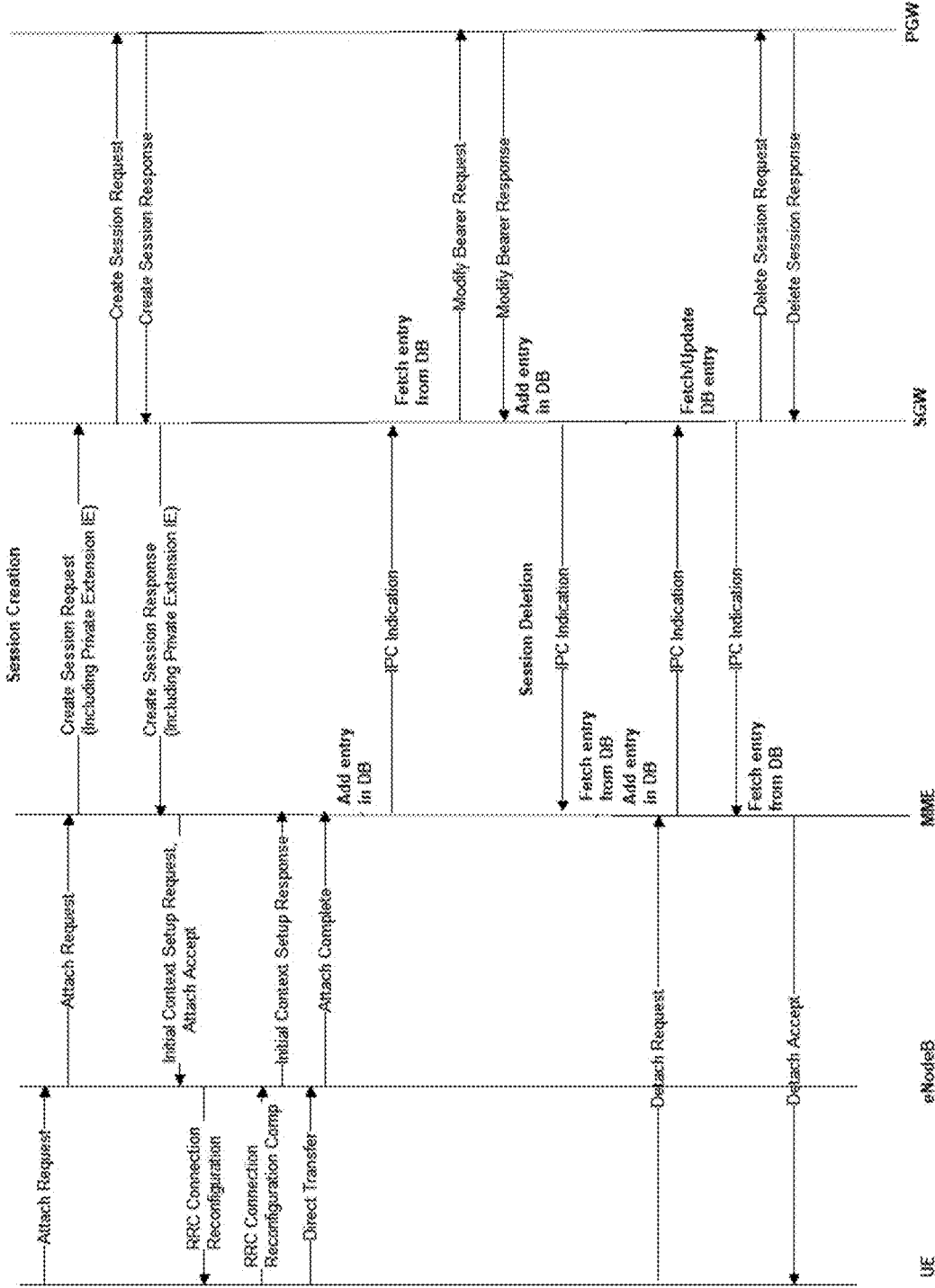
FIG. 6 is a diagram of a call flow for a session creation/deletion for MME and SGW, in accordance with some embodiments.

The call flow 600 for Session Creation/Deletion for MME and SGW as per the solution described above is shown in FIG. 6.

In the similar fashion, IPC will replace the network messaging for other operations like bearer management, Network Triggered Service Procedure, Handovers etc.

This approach will save on significant L5, L4, L3 and L2 processing for GTPC messages required to be sent/received on S11 and S5/S8 interfaces thus eliminating most part of the stack processing for those messages. It will decrease load on the core nodes thus increasing the overall system performance.

Figure 7:
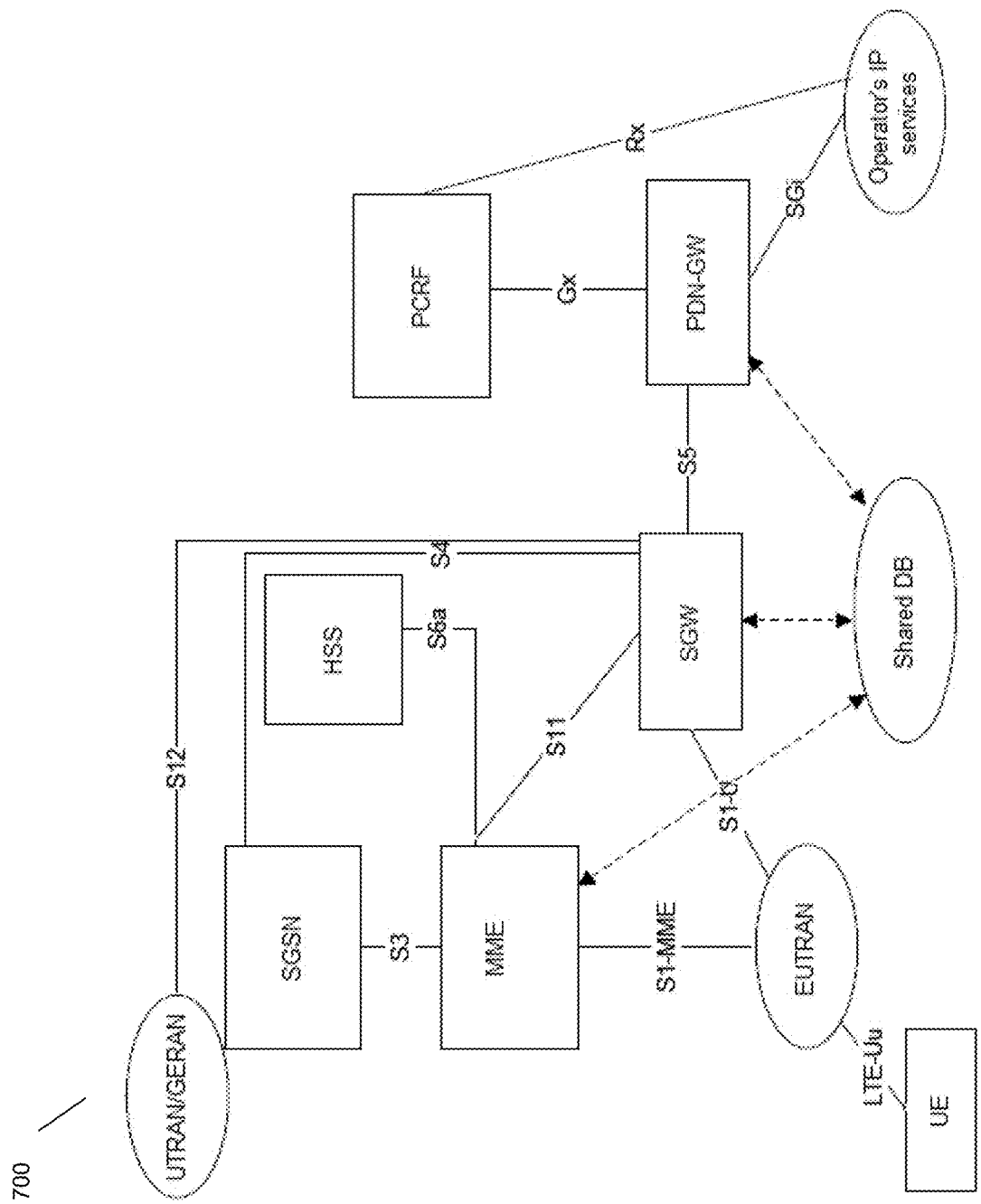
FIG. 7 is an architecture diagram with GTPC optimization, in accordance with some embodiments.

Referring now to FIG. 7, the proposed architecture 700 is shown when the MME selects another SGW for this UE, socket information shall be exchanged again with new SGW in first request/response and then IPC shall be used for further information exchange.

It saves on major part of stack processing compared to the GTPC messages being transferred over S11 and S5/S8 interfaces.

For the existing products, optimization does not work for non-collocated nodes.

As soon as MME selects a different SGW, optimization does not work.

However, optimization suggested here would work even for remote nodes as long as both the nodes are HNG and support GTPC optimization feature.

This approach enables core network nodes to minimize the control traffic over S11, S5/S8 interfaces etc. along with the flexibility of running these nodes separately.

This feature empowers the solution to give better performance and make optimal use of network resources even in the scenarios where core nodes are not co-located.

This solution can be virtualized by running different executables on different virtual nodes. In this architecture, shared database would be the part of the global namespace enabling access to the shared core nodes.

Figure 8:
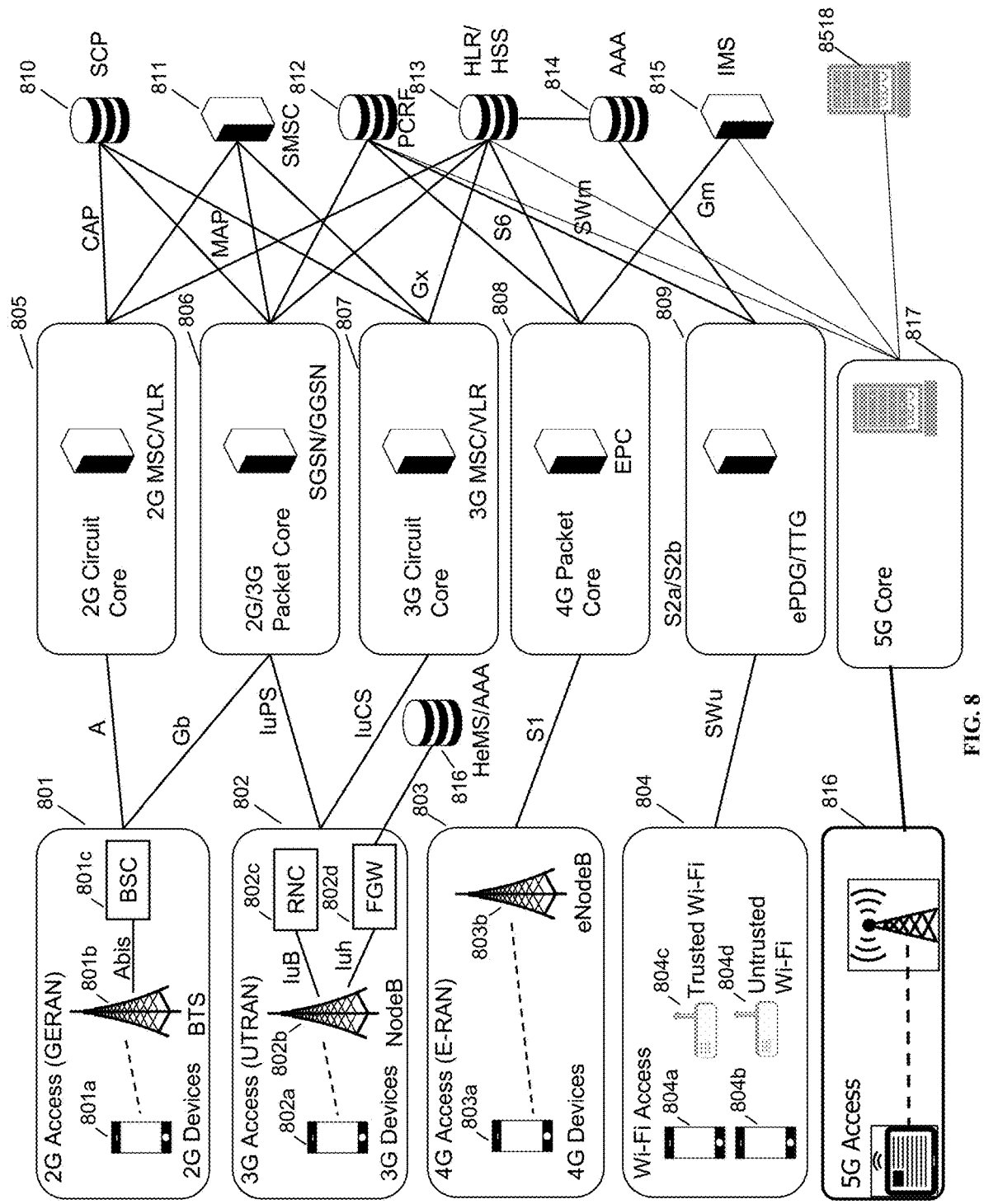
FIG. 8 is a schematic network architecture diagram for 3G and other-G prior art networks.

FIG. 8 is a schematic network architecture diagram for 3G and other-G prior art networks. The diagram shows a plurality of "Gs," including 2G, 3G, 4G, 5G and Wi-Fi. 2G is represented by GERAN 801, which includes a 2G device 801a, BTS 801b, and BSC 801c. 3G is represented by UTRAN 802, which includes a 3G UE 802a, nodeB 802b, RNC 802c, and femto gateway (FGW, which in 3GPP namespace is also known as a Home nodeB Gateway or HNBGW) 802d. 4G is represented by EUTRAN or E-RAN 803, which includes an LTE UE 803a and LTE eNodeB 803b. Wi-Fi is represented by Wi-Fi access network 804, which includes a trusted Wi-Fi access point 804c and an untrusted Wi-Fi access point 804d. The Wi-Fi devices 804a and 804b may access either AP 804c or 804d. In the current network architecture, each "G" has a core network. 2G circuit core network 805 includes a 2G MSC/VLR; 2G/3G packet core network 806 includes an SGSN/GGSN (for EDGE or UMTS packet traffic); 3G circuit core 807 includes a 3G MSC/VLR; 4G circuit core 808 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 830, the SMSC 831, PCRF 832, HLR/HSS 833, Authentication, Authorization, and Accounting server (AAA) 834, and IP Multimedia Subsystem (IMS) 835. An HeMS/AAA 836 is present in some cases for use by the 3G UTRAN. The diagram is used to indicate schematically the basic functions of each network as known to one of skill in the art, and is not intended to be exhaustive. For example, 5G core 817 is shown using a single interface to 5G access 816, although in some cases 5G access can be supported using dual connectivity or via a non-standalone deployment architecture.

Noteworthy is that the RANs 801, 802, 803, 804 and 836 rely on specialized core networks 805, 806, 807, 808, 809, 837 but share essential management databases 830, 831, 832, 833, 834, 835, 838. More specifically, for the 2G GERAN, a BSC 801c is required for Abis compatibility with BTS 801b, while for the 3G UTRAN, an RNC 802c is required for Iub compatibility and an FGW 802d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 9:
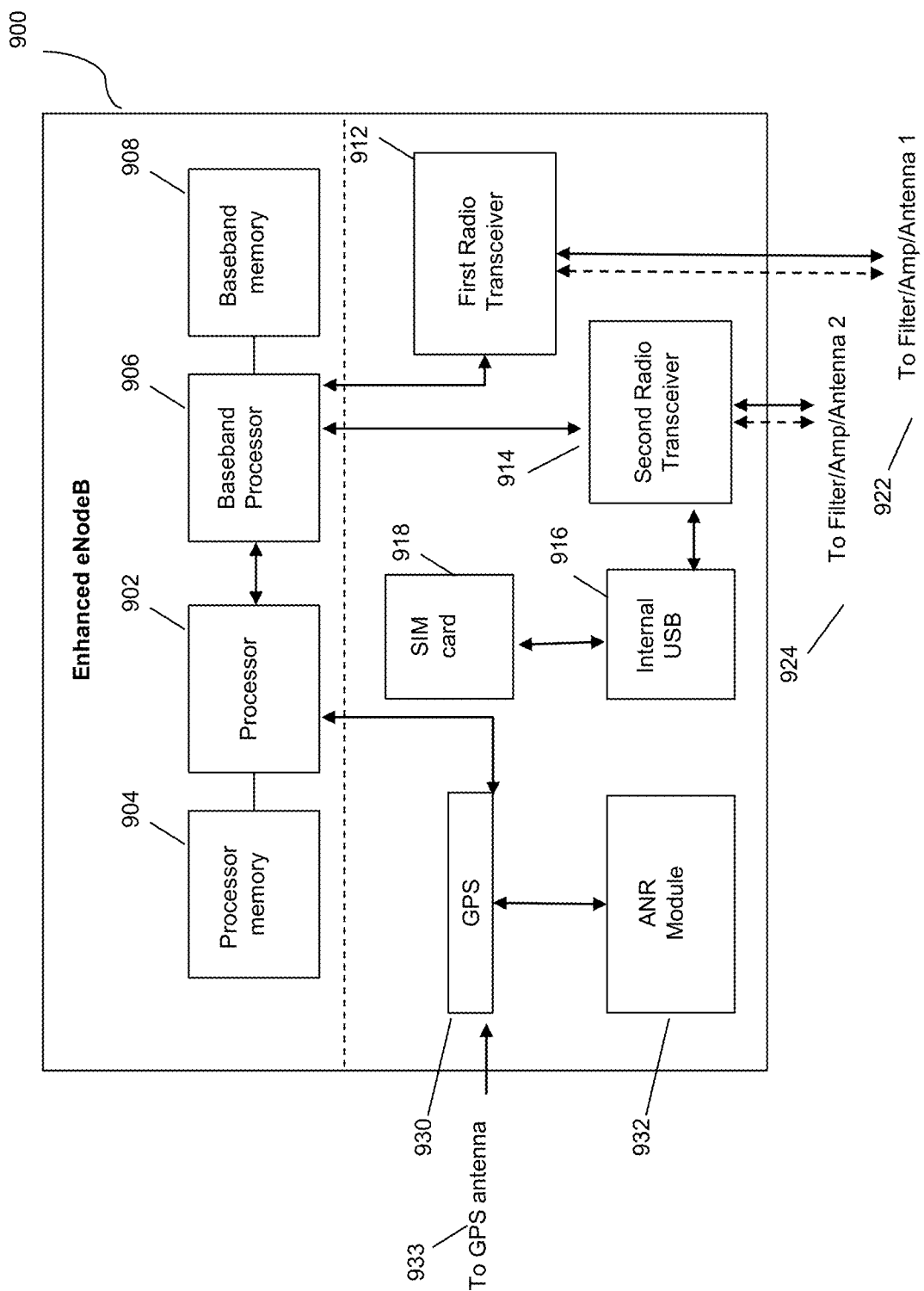
FIG. 9 is an enhanced eNodeB for performing the methods described herein, in accordance with some embodiments.

FIG. 9 is an enhanced eNodeB for performing the methods described herein, in accordance with some embodiments. Mesh network node 900 may include processor 902, processor memory 904 in communication with the processor, baseband processor 906, and baseband processor memory 908 in communication with the baseband processor. Mesh network node 900 may also include first radio transceiver 912 and second radio transceiver 914, internal universal serial bus (USB) port 916, and subscriber information module card (SIM card) 918 coupled to USB port 916. In some embodiments, the second radio transceiver 914 itself may be coupled to USB port 916, and communications from the baseband processor may be passed through USB port 916. The second radio transceiver may be used for wirelessly backhauling eNodeB 900.

Processor 902 and baseband processor 906 are in communication with one another. Processor 902 may perform routing functions, and may determine if/when a switch in network configuration is needed. Baseband processor 906 may generate and receive radio signals for both radio transceivers 912 and 914, based on instructions from processor 902. In some embodiments, processors 902 and 906 may be on the same physical logic board. In other embodiments, they may be on separate logic boards.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 912 and 914. Baseband processor 906 may use memory 908 to perform these tasks.

The first radio transceiver 912 may be a radio transceiver capable of providing LTE eNodeB functionality, and may be capable of higher power and multi-channel OFDMA. The second radio transceiver 914 may be a radio transceiver capable of providing LTE UE functionality. Both transceivers 912 and 914 may be capable of receiving and transmitting on one or more LTE bands. In some embodiments, either or both of transceivers 912 and 914 may be capable of providing both LTE eNodeB and LTE UE functionality. Transceiver 912 may be coupled to processor 902 via a Peripheral Component Interconnect-Express (PCI-E) bus, and/or via a daughtercard. As transceiver 914 is for providing LTE UE functionality, in effect emulating a user equipment, it may be connected via the same or different PCI-E bus, or by a USB bus, and may also be coupled to SIM card 918. First transceiver 912 may be coupled to first radio frequency (RF) chain (filter, amplifier, antenna) 922, and second transceiver 914 may be coupled to second RF chain (filter, amplifier, antenna) 924.

SIM card 918 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 912 and 914, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 902 for reconfiguration.

A GPS module 930 may also be included, and may be in communication with a GPS antenna 932 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 932 may also be present and may run on processor 902 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 10:
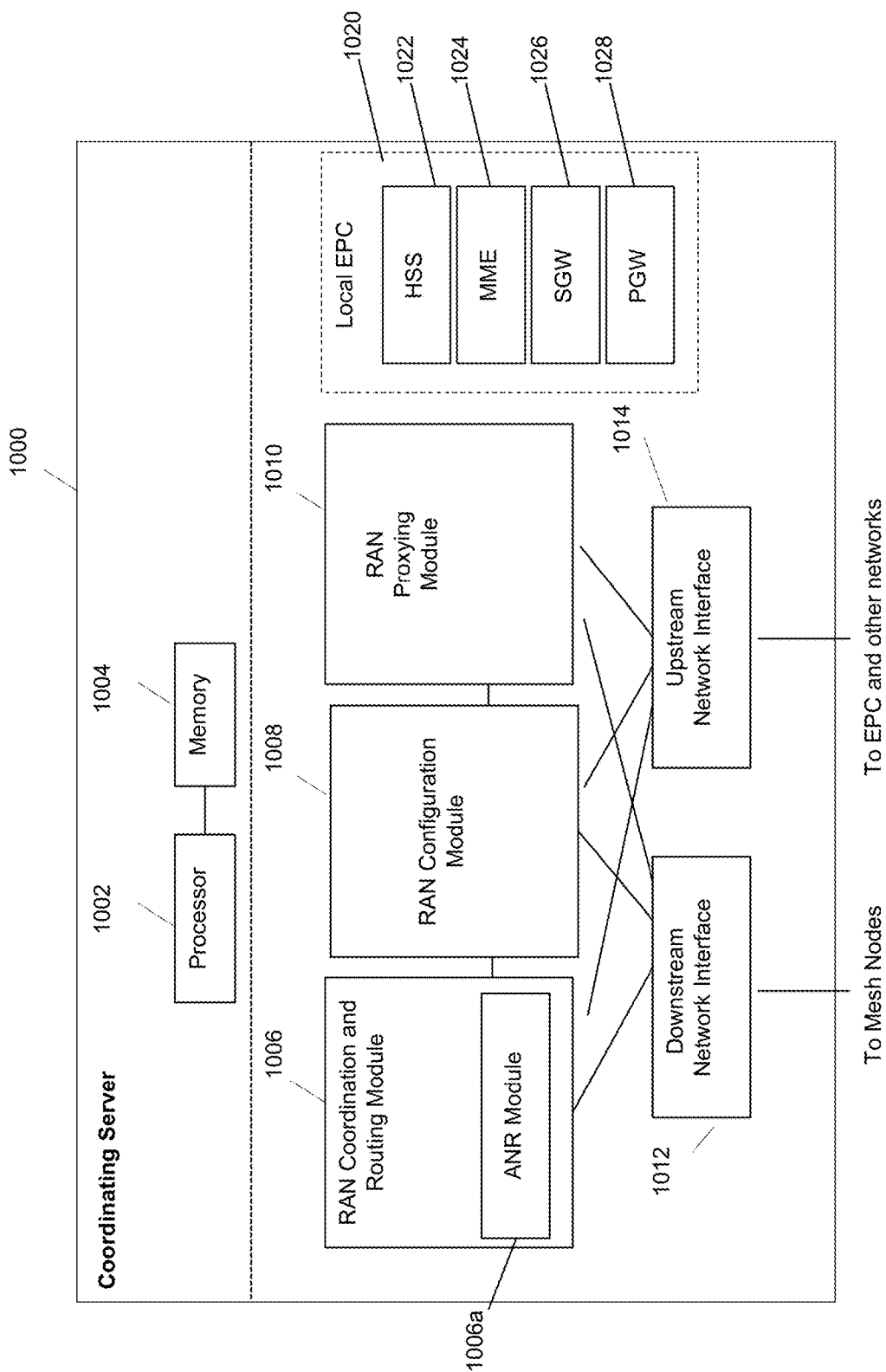
FIG. 10 is a coordinating server for providing services and performing methods as described herein, in accordance with some embodiments.

FIG. 10 is a coordinating server for providing services and performing methods as described herein, in accordance with some embodiments. Coordinating server 1000 includes processor 1002 and memory 1004, which are configured to provide the functions described herein. Also present are radio access network coordination/routing (RAN Coordination and routing) module 1006, including ANR module 1006a, RAN configuration module 1008, and RAN proxying module 1010. The ANR module 1006a may perform the ANR tracking, PCI disambiguation, ECGI requesting, and GPS coalescing and tracking as described herein, in coordination with RAN coordination module 1006 (e.g., for requesting ECGIs, etc.). In some embodiments, coordinating server 1000 may coordinate multiple RANs using coordination module 1006. In some embodiments, coordination server may also provide proxying, routing virtualization and RAN virtualization, via modules 1010 and 1008. In some embodiments, a downstream network interface 1012 is provided for interfacing with the RANs, which may be a radio interface (e.g., LTE), and an upstream network interface 1014 is provided for interfacing with the core network, which may be either a radio interface (e.g., LTE) or a wired interface (e.g., Ethernet).

Coordinator 1000 includes local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Modules 1006, 1008, 1010 and local EPC 1020 may each run on processor 1002 or on another processor, or may be located within another device.

In 5GC, the function of the SGW is performed by the SMF and the function of the PGW is performed by the UPF. The inventors have contemplated the use of the disclosed invention in 5GC as well as 5G/NSA and 4G. As applied to 5G/NSA, certain embodiments of the present disclosure operate substantially the same as the embodiments described herein for 4G. As applied to 5GC, certain embodiments of the present disclosure operate substantially the same as the embodiments described herein for 4G, except by providing an N4 communication protocol between the SMF and UPF to provide the functions disclosed herein.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method of providing GPRS Tunneling Protocol Core (GTPC) optimization, comprising:
   sending a first message from a Mobility Management Entity (MME) to a peer node, the first message including a feature name and socket information in a private extension over an interface;
   wherein a message format for the first message includes a message type, a Tunnel Endpoint IDentifier (TEID) and a bitmask;
   when the peer node supports GTPC optimization, then confirming, by the peer node, by encoding the socket information in a response message and sending the response message to the MME.

2. The method of claim 1 further comprising writing a message in a shared database for all the subsequent messaging between the MME and the peer node, and informing the peer node to read the message from the database by sending an indication via Inter Process Communication (IPC).

3. The method of claim 1 further comprising deleting a session by sending a third message from the MME to the peer node, and sending a fourth message from the peer node to the MME.

4. The method of claim 3 wherein the sending the third message comprises sending a Delete Session Request (DSR) message.

5. The method of claim 3 wherein the sending a fourth message comprises sending a Delete Session Response message.

6. The method of claim 1 wherein sending a first message to a peer node comprises sending a first message to a Serving Gateway (SGW) or to a Packet Gateway (PGW).

7. The method of claim 1 wherein the sending a first message comprises sending a Create Session Request (CSR) message.

8. The method of claim 1 wherein the sending a second message comprises sending a Create Session Response message.

9. The method of claim 1 wherein sending a first message comprises sending a first message over an S11 interface or an S5 interface.

10. The method of claim 1 wherein the GTPC optimization is performed in a 4G network or in a 5G network.

11. A system providing GPRS Tunneling Protocol Core (GTPC) optimization, comprising:
    a peer node in communication with a Mobility Management Entity (MME), the peer node receiving a first message from the MME, the first message including a feature name and socket information in a private extension over an interface;
    wherein a message format for the first message includes a message type, a Tunnel Endpoint IDentifier (TEID) and a bitmask;
    when the peer node supports GTPC optimization, then confirming, by the peer node, by encoding the socket information in a response message and sending the response message to the MME.

12. The system of claim 11 wherein a message is written in a shared database for all the subsequent messaging between the MME and the peer node, and wherein the peer node is informed to read the message from the database by receiving an indication via Inter Process Communication (IPC) from the MME.

13. The system of claim 1 wherein the session is deleted by receiving a third message from the MME at the peer node, and by sending a fourth message from the peer node to the MME.

14. The system of claim 13 wherein the third message comprises a Delete Session Request (DSR) message.

15. The system of claim 13 wherein the fourth message comprises a Delete Session Response message.

16. The system of claim 11 wherein the peer node comprises a Serving Gateway (SGW) or to a Packet Gateway (PGW).

17. The system of claim 11 wherein the first message comprises a Create Session Request (CSR) message.

18. The system of claim 11 wherein the second message comprises Create Session Response message.

19. The system of claim 11 wherein the first message is sent over an S11 interface or an S5 interface.

20. The system of claim 11 wherein the GTPC optimization is performed in a 4G network or in a 5G network.

* * * * *